United States Patent
Mansour

(10) Patent No.: US 8,478,298 B1
(45) Date of Patent: Jul. 2, 2013

(54) APPARATUS AND METHOD FOR SELECTING ACCESS POINTS FOR USE IN POSITIONING

(71) Applicant: Texas Instruments Incorporated, Dallas, TX (US)

(72) Inventor: Mohamed Farouk Mansour, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 13/666,658

(22) Filed: Nov. 1, 2012

(51) Int. Cl.
*H04W 4/02* (2009.01)

(52) U.S. Cl.
USPC .................. 455/456.1; 370/248; 370/315

(58) Field of Classification Search
USPC ............. 455/456.1, 456.2, 456.3, 456.5, 457; 701/207; 370/315, 328
See application file for complete search history.

(56) References Cited

U.S. PATENT DOCUMENTS

2008/0004042 A1* 1/2008 Dietrich et al. ............ 455/456.1
2011/0310748 A1* 12/2011 Mizugaki et al. ............. 370/248

* cited by examiner

*Primary Examiner* — Phuoc Doan
(74) *Attorney, Agent, or Firm* — Steven A. Shaw; W. James Brady; Frederick J. Telecky, Jr.

(57) ABSTRACT

Apparatus and method for positioning a device based on wireless local area network signals. In one embodiment, a wireless local network positioning system includes access point selection logic. The access point selection logic includes likelihood computation logic, minimum mean squared error (MMSE) estimation logic, variance computation logic, and access point exclusion logic. The likelihood computation logic is configured to compute a likelihood value for each access point and point of a positioning grid. The MMSE estimation logic is configured to compute an MMSE estimate based on the likelihood values. The variance computation logic is configured to compute an MMSE variance for the MMSE estimate. The access point exclusion logic is configured to determine whether excluding a selected one of the access points reduces the MMSE variance, and to exclude the selected access point from the access points used for positioning, based on the exclusion reducing the MMSE variance.

20 Claims, 2 Drawing Sheets

APPARATUS AND METHOD FOR SELECTING ACCESS POINTS FOR USE IN POSITIONING

BACKGROUND

As mobile devices proliferate, the demand for services tailored to device location also increases. Location based services depend on positioning systems to determine device location. Satellite based positioning systems, such as the global positioning system (GPS), GLONASS, and Galileo can provide high accuracy, but require a clear line of sight between the satellites and the mobile device to provide a position determination. Consequently, satellite positioning systems are largely ineffective for indoor positioning. Satellite positioning also requires specialized receivers that may increase the cost of the mobile device.

As an alternative or an augmentation to satellite based positioning, wireless local area network (WLAN) based positioning systems have been developed. WLAN based positioning systems are suitable for indoor positioning and require minimal investment because they make use of existing infrastructure. Furthermore, many mobile wireless devices include support for communication via WLAN.

WLAN based positioning systems determine mobile device position based on the established positions of WLAN access points visible to the device and the strength of signals exchanged between the mobile device and the access points.

SUMMARY

Apparatus and method for positioning a device based on wireless local area network signals are disclosed herein. In one embodiment, a method for positioning includes identifying, by a wireless device, a plurality of access points useable to determine a position of the wireless device. A likelihood value for each access point is computed, by the wireless device, for each of a plurality of points of a positioning grid. A minimum mean squared error (MMSE) estimate and an MMSE variance based on the likelihood values for the access points are computed by the wireless device. Whether excluding a selected one of the access points reduces the MMSE variance is determined by the wireless device. The selected access point is excluded from a set of the access points used to determine the position of the wireless device, based on the determining finding that excluding the selected access point reduces the MMSE variance.

In another embodiment, a wireless device includes a positioning system. The positioning system is configured to determine a position of the device based on positioning signals received from wireless local area network access points that conform to a predetermined channel model. The positioning system is also configured to identify access points useable for determining a position of the wireless device. The positioning system is further configured to compute for each of a plurality of points of a positioning grid, a likelihood value for each identified access point, and to compute a minimum mean squared error (MMSE) estimate and an MMSE variance based on the likelihood values for the access points. The positioning system is yet further configured to determine whether excluding a selected one of the access points reduces the MMSE variance, and to exclude the selected access point from a set of the access points used for positioning of the wireless device based on a determination that exclusion of the selected access point reduces the MMSE variance.

In a further embodiment, a wireless local network positioning system includes access point selection logic. The access point selection logic includes likelihood computation logic, MMSE estimation logic, variance computation logic, and access point exclusion logic. The likelihood computation logic is configured to compute for each of a plurality of points of a positioning grid, a likelihood value for each of a plurality of access points identified as useable to determine a position. The MMSE estimation logic is configured to compute an MMSE estimate based on the likelihood values for the access points. The variance computation logic is configured to compute an MMSE variance for the MMSE estimate. The access point exclusion logic is configured to determine whether MMSE variance is reduced by excluding a selected one of the access points from a set of the access points used for positioning, and to exclude the selected access point from the set of the access points used for positioning based on a determination that exclusion of the selected access point reduces the MMSE variance.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections. Further, the term "software" includes any executable code capable of running on a processor, regardless of the media used to store the software. Thus, code stored in memory (e.g., non-volatile memory), and sometimes referred to as "embedded firmware," is included within the definition of software. The recitation "based on" is intended to mean "based at least in part on." Therefore, if X is based on Y, X may be based on Y and any number of other factors.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

In order for a mobile wireless device to establish its location via wireless local area network (WLAN) positioning, the device receives signals transmitted by access points (APs) in the vicinity of the device. The locations of the APs are known, and based on the strengths of the received AP signals the mobile wireless device can estimate its position. The wireless device computes the likelihood of observing the signal received from an AP at each of plurality of points of a positioning grid. The likelihood is computed based on a channel model, for example, the log-normal shadowing model. Unfortunately, if an AP fails to conform to the applied channel model, then using the AP for positioning may detrimentally affect positioning performance. Embodiments of the present disclosure provide improved WLAN positioning performance by excluding from the set of APs used for positioning APs that fail to conform to the applied channel model.

Figure 1:
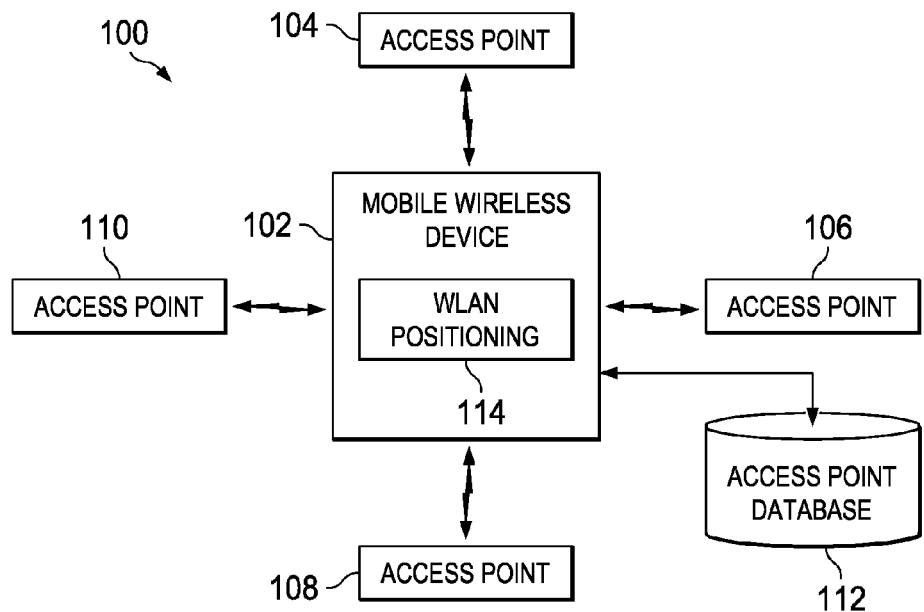
FIG. 1 shows a block diagram of a system for determining the position of a wireless device based on wireless local area network (WLAN) access points (APs) in accordance with various embodiments.

FIG. 1 shows a block diagram of a system 100 for using WLAN access points to determine the position of a wireless device in accordance with various embodiments. The system 100 includes a mobile wireless device 102 and a plurality of WLAN access points 104-110. The mobile wireless device 102 is positioned to wirelessly communicate with one or more of the access points 104-110 each associated with a WLAN (e.g., a network in accordance with one or more the IEEE 802.11 standards). In the embodiment of FIG. 1, the mobile wireless device 102 is positioned to receive transmissions from and/or communicate with any of the access points 104-110. The mobile wireless device 102 may be a cellular telephone, a tablet computer, or any other mobile computing device configured for WLAN access. While only four access points and single mobile wireless device are shown in FIG. 1, in practice the system 100 may include any number of mobile wireless devices and access points.

The mobile wireless device 102 includes a WLAN positioning system 114 that determines the position of the mobile wireless device 102 based on the strengths of the signals received from the APs 104-110 and the known positions of the APs 104-110. In some embodiments of the system 100, the AP database 112 provides information regarding the positions of the APs 104-110 to the mobile wireless device 102. For example, the position of each AP 104-110 may be determined using satellite positioning (or other positioning techniques) and stored in the AP database 112 with information that identifies the AP 104-110. The AP database 112 may be contained within the mobile wireless device 102 or accessible to the mobile wireless device 102 via one of the APs 104-110 or via a different communication network (e.g., a wireless wide area network).

The WLAN positioning system 114 provides improved positioning performance for the mobile wireless device 102 by selecting which of the APs 104-110 to use for positioning. APs that conform to the applied channel model are included in the set of APs used for position, while APs failing to conform to the applied channel model may be excluded. Embodiments select APs for inclusion or exclusion based on how exclusion of an AP affects the variance of a minimum mean square error (MMSE) estimate over a positioning grid. Thus, the WLAN positioning system 114 evaluates the effect of exclusion of each of the APs 104-110 in the set of APs useable for positioning and may exclude those APs that increase the variance of an MMSE estimate computed over a plurality of points of a positioning grid.

Figure 2:
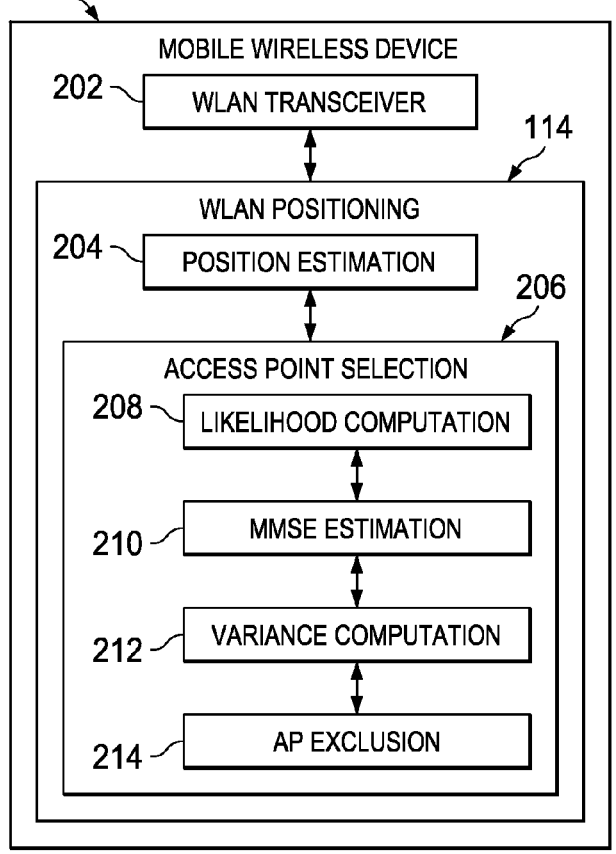
FIG. 2 shows a block diagram of a mobile wireless device configured to select WLAN access points to use for positioning based on MMSE variance in accordance with various embodiments.

FIG. 2 shows a block diagram of the mobile wireless device 102. The mobile wireless device 102 is configured to select APs 104-110 for use in positioning based whether the APs conform to the applied channel model. Embodiments of the mobile wireless device 102 analyze change in MMSE variance across the APs to identify which APs to use for positioning. The mobile wireless device 102 includes a WLAN transceiver 202 and a WLAN positioning system 114. The WLAN transceiver 202 provides an interface through which the mobile wireless device 102 accesses the wireless medium to communicate with one or more of the APs 104-110. The WLAN transceiver 202 receives signals transmitted by the APs 104-110 and derives signal strength values, such as received signal strength indicator (RSSI) values, from the received signals, that may be used to estimate distance between the mobile wireless device 102 and the APs 104-110 for WLAN-based positioning.

The WLAN positioning system 114 is coupled to the WLAN transceiver 202. The WLAN positioning system 114 includes a position estimation module 204 and an AP selection module 206. The position estimation module 204 is configured to estimate the position of the wireless device 102 based on known positions of a selected plurality of APs 104-110 and the received signal strength values for each AP of the selected plurality of APs 104-110. In some embodiments, the WLAN transceiver 202 provides received signal strength values to the WLAN positioning system 114, and the AP database 112 provides AP location information for use in mobile wireless device 102 position determination.

The AP selection module 206 communicates with the position estimation module 204. The AP selection module 206 is configured to select which of the APs 104-110 the position estimation module 204 uses to position the mobile wireless device 102, and to provide information identifying the selected APs 104-110 to the position estimation module. The AP selection module 206 excludes, from the APs 104-110 used for positioning, APs that increase MMSE variance when used for positioning.

The AP selection module 206 includes likelihood computation logic 208, MMSE computation logic 210, variance computation logic 212, and AP exclusion logic 214. The likelihood computation logic 208 computes the likelihood contribution of each AP 104-110 at each point of a positioning grid. At a grid point u, with N visible APs (with observed signal $R_i$ where $1 \leq i \leq N$) and up to M invisible APs, the likelihood computation logic 208 can compute the likelihood at u as:

$$L(R \mid u) = \sum_{i=1}^{N} L(R_i \mid u) + L(V_i \mid u) + \sum_{j=1}^{M} L(\overline{V}_j \mid u) \quad (1)$$

where:

$L(R_i|u)$ is the likelihood of observing R from the i-th AP at u ($L(R_i|u)$ may be computed based on the applied channel model and is function of the distance between the i-th AP and u);

$L(V_i|u)$ is the log of the probability of detecting the i-th AP at u (this probability is a function of distance), and $L(\overline{V}_j|u)$ is the log probability of not detecting the j-th invisible AP at u (this is also a function of the distance between the j-th invisible AP and u).

The MMSE estimation logic 210 computes MMSE over the points of the positioning grid based on the likelihood values produced by the likelihood computation logic 208. The MMSE estimation logic 210 generates the MMSE estimate as:

$$\hat{g}=E\{u|R\}=\int_u u\cdot p(u|R)=\int_u u\cdot P(R|u)P(u)/P(R), \quad (2)$$

where $E\{\ \}$ is the expected-value operator. Assuming that all points in the positioning grid are equally likely then the MMSE may be estimated as:

$$\hat{g}=c\int_u u\cdot P(R|u) \quad (3)$$

where c is a normalizing factor such that $c\int_u P(R|u)=1$.

Using the grid sampling and likelihood value at each point of the positioning grid, the MMSE estimation logic 210 may numerically approximate equation (3) as:

$$\hat{g}=c\Sigma_u u\cdot P(R|u) \quad (4)$$

where:

$P(R|u)=\exp(L(R|u))$, and $c=(\Sigma_u \exp(L(R|u)))^{-1}$.

The variance computation logic 212 generates variance of the MMSE computed by the MMSE estimation logic 210, as:

$$\mathrm{var}(\hat{g})=c\Sigma_u(u-\hat{g})^2\cdot P(R|u) \quad (5)$$

The AP exclusion logic 214 selects a set of APs 104-110 for use in positioning based on MMSE estimations and MMSE variances provided by the MMSE estimation logic 210 and the variance estimation logic 210. A set of APs 104-110 selected, by the AP exclusion logic 214, for use in positioning excludes given APs 104-110 whose inclusion in the set increases MMSE variance. Thus, the AP exclusion logic 214 is configured to identify APs 104-110 that increase MMSE variance if included in a set of APs 104-110 used for positioning and exclude the identified APs based on the exclusion producing at least a predetermined degree of change in MMSE, and the resultant set of APs including at least a minimum number of APs. In this manner, the AP exclusion logic 214 improves positioning performance by selecting a set of APs 104-110 for use in positioning that best conform to the applied channel model. The operations of the AP exclusion logic 214 are more specifically detailed herein with regard to FIG. 3.

Various components of the mobile wireless device 102 including at least some portions of the WLAN positioning system 114 can be implemented using a processor executing software instructions that cause the processor to perform the operations described herein. In some embodiments, the WLAN positioning system 114 includes a processor executing software instructions that causes the processor to select APs for exclusion from use in positioning as disclosed herein, and to apply a set of APs that excludes those so selected to improve the positioning performance of the mobile wireless device 102.

Suitable processors include, for example, general-purpose microprocessors, digital signal processors, and microcontrollers. Processor architectures generally include execution units (e.g., fixed point, floating point, integer, etc.), storage (e.g., registers, memory, etc.), instruction decoding, peripherals (e.g., interrupt controllers, timers, direct memory access controllers, etc.), input/output systems (e.g., serial ports, parallel ports, etc.) and various other components and sub-systems. Software programming (i.e., processor executable instructions) that causes a processor to perform the operations disclosed herein can be stored in a computer readable storage medium. A computer readable storage medium comprises volatile storage such as random access memory, non-volatile storage (e.g., a hard drive, an optical storage device (e.g., CD or DVD), FLASH storage, read-only-memory), or combinations thereof. Processors execute software instructions. Software instructions alone are incapable of performing a function. Therefore, in the present disclosure any reference to a function performed by software instructions, or to software instructions performing a function is simply a shorthand means for stating that the function is performed by a processor executing the instructions.

In some embodiments, portions of the mobile wireless device 102, including portions of the WLAN positioning system 114 may be implemented using dedicated circuitry (e.g., dedicated circuitry implemented in an integrated circuit). Some embodiments may use a combination of dedicated circuitry and a processor executing suitable software. For example, some portions of the WLAN positioning system 114 may be implemented using a processor or hardware circuitry. Selection of a hardware or processor/software implementation of embodiments is a design choice based on a variety of factors, such as cost, time to implement, and the ability to incorporate changed or additional functionality in the future.

Figure 3:
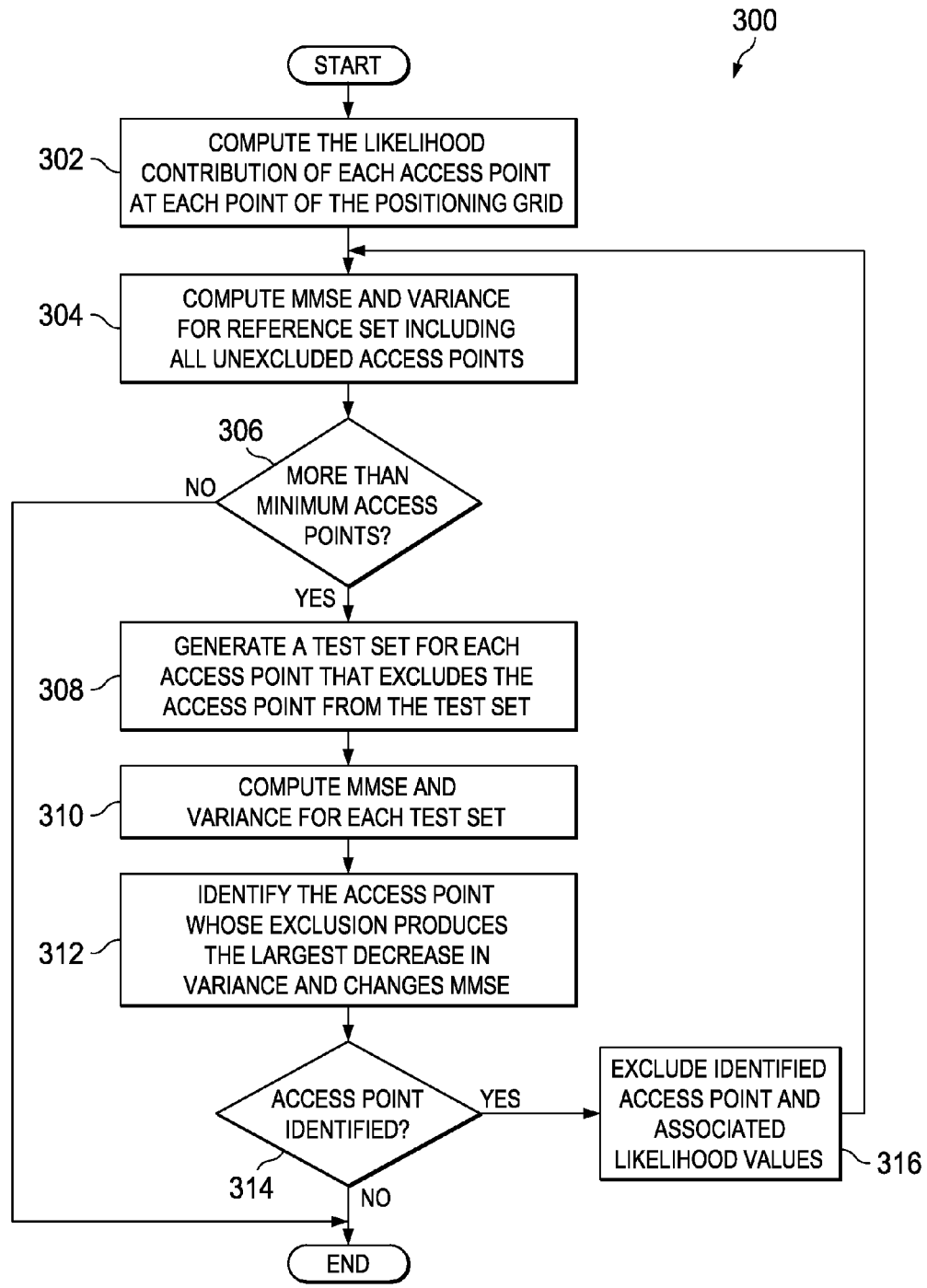
FIG. 3 shows a flow diagram for a method for positioning that includes selecting WLAN access points based on MMSE variance in accordance with various embodiments.

FIG. 3 shows a flow diagram for a method 300 for positioning that includes selecting WLAN access points based on MMSE variance in accordance with various embodiments. Though depicted sequentially as a matter of convenience, at least some of the actions shown can be performed in a different order and/or performed in parallel. Additionally, some embodiments may perform only some of the actions shown. The operations of the method 300 can be performed by the WLAN positioning system 114. In some embodiments, at least some of the operations of the method 300, as well as other operations described herein, can be performed by a processor executing instructions stored in a computer readable medium. The operations of the method 300 may be applied to selectively exclude visible or invisible APs from the set of APs used for positioning.

In block 302, the wireless device 102 computes the likelihood contribution for each AP 104-110 at each point of the positioning grid. None of the APs 104-110 useable for positioning are excluded from the likelihood computation. The likelihoods may be computed as per equation (1). The likelihood computation may be performed by the likelihood computation logic 208.

In block 304, the wireless device 102 computes, based on the likelihood values, an MMSE estimate and an MMSE variance for the current set of APs 104-110. For example, the current set of APs may include all APs 104-110 useable for positioning when the operations of block 302 immediately precede the operations of block 304, while in subsequent iterations, the current set of APs may include fewer that all the APs 104-110. The wireless device 102 may produce the MMSE estimate and MMSE variance in accordance with equations (4) and (5). The MMSE estimation logic 210 may compute the MMSE estimate, and the variance computation logic 212 may compute the MMSE variance.

In block 306, the wireless device 102 determines whether the current set of APs 104-110 useable for positioning includes more than a predetermined minimum number of APs needed for accurate positioning. For example, if the current set of APs useable for positioning does not include at least four APs, then current set of APs may be deemed the final set of APs to be applied in positioning.

If, in block 306, the wireless device 102 determines that the current set of APs 104-110 useable for positioning includes more than the predetermined minimum number of APs, then AP selection continues. In block 308, the wireless device 102 generates a test set for each AP that excludes the AP from the test set. For example, given APs 104-110, a first test set includes APs 104, 106, 108, a second test set includes APs 104, 106, 110, a third test set includes APs 104, 108, 110, and a fourth test set includes APs 106, 108, 110. Thus, each test set excludes one AP of the current set of APs useable for positioning.

In block 310, the wireless device 102 computes an MMSE estimate and an MMSE variance for each test set of APs. The MMSE estimate and an MMSE variance for each test set are computed based on the likelihood values for each AP in the test set and may be in accordance with equations (4) and (5).

In block 312, the wireless device 102 compares the variances computed for the test sets to the variance computed for the current set of APs. Via the comparison, the wireless device 102 identifies the test set, and the AP whose exclusion, produces the largest decrease in variance relative to the variance of the current set of APs useable for positioning, while also producing at least a predetermined minimum change in MMSE relative to the MMSE of the current set of APs. That is, an AP may be excluded if exclusion of the AP reduces variance and produces at least a predetermined minimum change in MMSE (e.g., 1 meter).

In block 314, if no test set and corresponding AP, have been identified as reducing variance, then the current set of APs may be deemed the final set of APs, i.e., the set of APs to be applied in positioning. On the other hand, if a test set and corresponding AP, have been identified as reducing variance, then in block 316, the AP excluded from the identified test set, and likelihood values corresponding to the excluded AP are removed from further consideration with regard to positioning and AP selection. Thereafter, the method 300 may begin a new AP selection iteration in block 304 by computing MMSE and MMSE variance for the revised current set of APs that excludes the AP identified in the test set. In at least some embodiments, the iterative operation of blocks 304-316 may be performed or controlled by the AP exclusion logic 214.

AP selection/exclusion operations performed by the WLAN positioning system 114 may also be expressed in pseudo-code as follows. While the pseudo-code refers to visible APs, the operations also applicable to invisible APs.

```
bestVar=inf; // initialize variance to maximum
while
(numvisibleAP>MIN_NUMBER_OF_VISIBLE_APS)
    AND
    (there exist bad APs)
    // identify AP producing highest variance if excluded
        for i=1:numVisibleAP
        [currEst, currVar]=MMSE estimate & variance without
            the i-th visible AP.
            if    norm(currEst-refEst)>threshold    AND
                currVar<bestVar
                bestVar=currVar;
                r=i;
            endif
        endfor
    remove the likelihoods of the r-th visible AP from the
        output buffer.
    [refEst,refVar]=MMSE estimate without the r-th visible
        AP.
    numVisibleAP=numVisibleAP−1.
endwhile
```

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method for positioning, comprising:
identifying, by a wireless device, a plurality of access points useable to determine a position of the wireless device;
computing, by the wireless device, for each of a plurality of points of a positioning grid, a likelihood value for each of the access points;
computing, by the wireless device, a minimum mean squared error (MMSE) estimate and an MMSE variance based on the likelihood values for the access points;
determining, by the wireless device, whether excluding a selected one of the access points reduces the MMSE variance; and
excluding, by the wireless device, the selected access point from a set of the access points used to determine the position of the wireless device, based on the determining finding that excluding the selected access point reduces the MMSE variance.

2. The method of claim 1, comprising:
determining whether excluding the selected one of the access points changes the MMSE estimate by at least a predetermined amount; and
excluding the selected access point from the set of the access points used to determine the position of the wireless device, based on the determining finding that excluding the selected access point changes the MMSE estimate by at least the predetermined amount.

3. The method of claim 1, further comprising:
determining the number of access points in the set of access points; and
performing the excluding only if the determined number of access points in the set of access points is greater than a predetermined number of access points needed for positioning.

4. The method of claim 1, further comprising removing likelihood values corresponding to the selected access point from likelihood values used to compute MMSE estimate and MMSE variance.

5. The method of claim 1, wherein the identified access points comprise at least one of:
access points visible to the wireless device; and
access points invisible to the wireless device.

6. The method of claim 1, further comprising executing the determining and excluding over all combinations of the identified access points that comprise a number of access points greater than a predetermined minimum number of access points.

7. A wireless device, comprising:
a positioning system configured to determine a position of the wireless device based on positioning signals received from wireless local area network access points that conform to a predetermined channel model, the positioning system configured to:
identify access points useable for determining a position of the wireless device;
compute for each of a plurality of points of a positioning grid, a likelihood value for each identified access point;
compute a minimum mean squared error (MMSE) estimate and an MMSE variance based on the likelihood values for the access points;
determine whether excluding a selected one of the access points reduces the MMSE variance; and exclude the selected access point from a set of the access points used for positioning of the wireless device, based on a determination that exclusion of the selected access point reduces the MMSE variance.

8. The wireless device of claim 7, wherein the positioning system is configured to:
determine whether excluding the selected one of the access points changes the MMSE estimate by at least a predetermined amount; and
exclude the selected access point from the set of the access points used for positioning, based a determination that exclusion of the selected access point changes the MMSE estimate by at least the predetermined amount.

9. The wireless device of claim 7, wherein the positioning system is configured to:
determine a count of access points in the set of the access points; and
exclude the selected access point only if the determined count of access points is greater than a predetermined number of access points needed to determine the position of the device.

10. The wireless device of claim 7, wherein the positioning system is configured to remove likelihood values for the selected access point from likelihood values used to compute MMSE estimate and MMSE variance.

11. The wireless device of claim 7, wherein the selected access point comprises an access point invisible to the wireless device.

12. The wireless device of claim 7, wherein the selected access point comprises an access point visible to the wireless device.

13. The wireless device of claim 7, wherein the positioning system is configured to:
over all combinations of the identified access points that comprise a number of access points greater than a predetermined minimum number of access points:
determine whether excluding a selected one of the access points reduces the MMSE variance; and
exclude the selected access point from the set of the access points, based a determination that exclusion of the selected access point reduces the MMSE variance.

14. A wireless local area network positioning system, comprising:
access point selection logic, comprising:
likelihood computation logic configured to compute for each of a plurality of points of a positioning grid, a likelihood value for each of a plurality of access points identified as useable to determine a position;
minimum mean squared error (MMSE) estimation logic configured to compute an MMSE estimate based on the likelihood values for the access points;
variance computation logic configured to compute an MMSE variance for the MMSE estimate;
access point exclusion logic configured to:
determine whether MMSE variance is reduced by excluding a selected one of the access points from a set of the access points used for positioning; and
exclude the selected access point from the set of the access points used for positioning, based on a determination that exclusion of the selected access point reduces the MMSE variance.

15. The wireless local area network positioning system of claim 14, wherein the access point exclusion logic is configured to:
determine whether the MMSE estimate is changed by at least a predetermined amount by excluding the selected one of the access points from the set of the access points used for positioning; and
exclude the selected access point from the set of the access points used for positioning, based on a determination that exclusion of the selected access point changes the MMSE estimate by at least the predetermined amount.

16. The wireless local area network positioning system of claim 14, wherein the access point exclusion logic is configured to:
determine a count of access points in the set of the access points used for positioning; and
exclude the selected access point only if the determined count of access points is greater than a predetermined number of access points needed to determine the position of the device.

17. The wireless local area network positioning system of claim 14, wherein the likelihood computation logic is configured to remove likelihood values for the selected access point from likelihood values used to compute MMSE estimate and MMSE variance.

18. The wireless local area network positioning system of claim 14, wherein the selected access point comprises an access point invisible to the positioning system.

19. The wireless local area network positioning system of claim 14, wherein the selected access point comprises an access point visible to the positioning system.

20. The wireless local area network positioning system of claim 14, wherein the access point exclusion logic is configured to:
over all combinations of the access points useable for positioning that comprise a number of access points greater than a predetermined minimum number of access points:
determine whether excluding a selected one of the access points from the set of the access points used for positioning reduces the MMSE variance; and
exclude the selected access point from the set of the access points used for positioning based on a determination that exclusion of the selected access point reduces the MMSE variance.

\* \* \* \* \*